US012810530B2

(12) United States Patent
Yang et al.

(10) Patent No.: US 12,810,530 B2
(45) Date of Patent: Nov. 24, 2026

(54) METHOD, APPARATUS, STORAGE MEDIUM, DEVICE AND PROGRAM PRODUCT FOR IMAGE PROCESSING

(71) Applicant: Beijing Zitiao Network Technology Co., Ltd., Beijing (CN)

(72) Inventors: Bangbang Yang, Beijing (CN); Lin Ma, Beijing (CN); Wenqi Dong, Beijing (CN); Wenbo Hu, Beijing (CN); Yuewen Ma, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 106 days.

(21) Appl. No.: 18/904,723

(22) Filed: Oct. 2, 2024

(65) Prior Publication Data

US 2025/0131642 A1 Apr. 24, 2025

(30) Foreign Application Priority Data

Oct. 18, 2023 (CN) ........................ 202311352097.8

(51) Int. Cl.

| | |
|---|---|
| ***G06T 7/50*** | (2017.01) |
| ***G06T 3/4053*** | (2024.01) |
| ***G06T 5/30*** | (2006.01) |
| ***G06T 7/13*** | (2017.01) |
| ***G06T 15/06*** | (2011.01) |

(52) U.S. Cl.

CPC ............ *G06T 15/06* (2013.01); *G06T 3/4053* (2013.01); *G06T 5/30* (2013.01); *G06T 7/13* (2017.01); *G06T 7/50* (2017.01)

(58) Field of Classification Search

None

See application file for complete search history.

(56) References Cited

U.S. PATENT DOCUMENTS

2020/0372709 A1* 11/2020 Ponjou Tasse ............ G06T 7/55

FOREIGN PATENT DOCUMENTS

CN 115375533 A 11/2022

OTHER PUBLICATIONS

Hwang et al., "Text2Scene: Text-driven Indoor Scene Stylization with Part-aware Details" Jun. 2023. (Year: 2023).*

Park et al., "Instant Panoramic Texture Mapping with Semantic Object Matching for Large-Scale Urban Scene Reproduction", IEEE, 2021. (Year: 2021).*

(Continued)

*Primary Examiner* — Nicholas R Wilson

(57) ABSTRACT

The disclosure discloses a method, an apparatus, a storage medium, a device and a program product for image processing. The method includes: obtaining a prompt word and a scene mesh, wherein the prompt word is text information provided by a user and represents a scene style, and the scene mesh is a three-dimensional mesh with a real texture generated based on a real scene reconstruction; generating a stylized panoramic texture map at the center position of the scene mesh based on the prompt word; projecting the texture of the stylized panoramic texture map to the visible area of the scene mesh to obtain a first stylized mesh texture mapping; and performing a spatial texture propagation processing on the first stylized mesh texture mapping to fill the non-visible area of the scene mesh to obtain a second stylized mesh texture mapping.

18 Claims, 5 Drawing Sheets

(56) References Cited

OTHER PUBLICATIONS

Bar-Tal et al., "MultiDiffusion: Fusing Diffusion Paths for Controlled Image Generation", ICML 2023, Apr. 25, 2023, pp. 1-16.
European Search Report for EP Patent Application No. 24204375.0, Issued on Feb. 24, 2025, 10 pages.
Hollein et al., "Text2Room: Extracting Textured 3D Meshes from 2D Text-to-Image Models", ICCV, 2023, pp. 7909-7920.
Park et al., "Instant Panoramic Texture Mapping with Semantic Object Matching for Large-Scale Urban Scene Reproduction", IEEE, vol. 27, No. 5, Mar. 24, 2021, pp. 2746-2756.
Yang et al., "DreamSpace: Dreaming Your Room Space with Text-Driven Panoramic Texture Propagation", IEEE, Apr. 15, 2024, pp. 1-14.

* cited by examiner

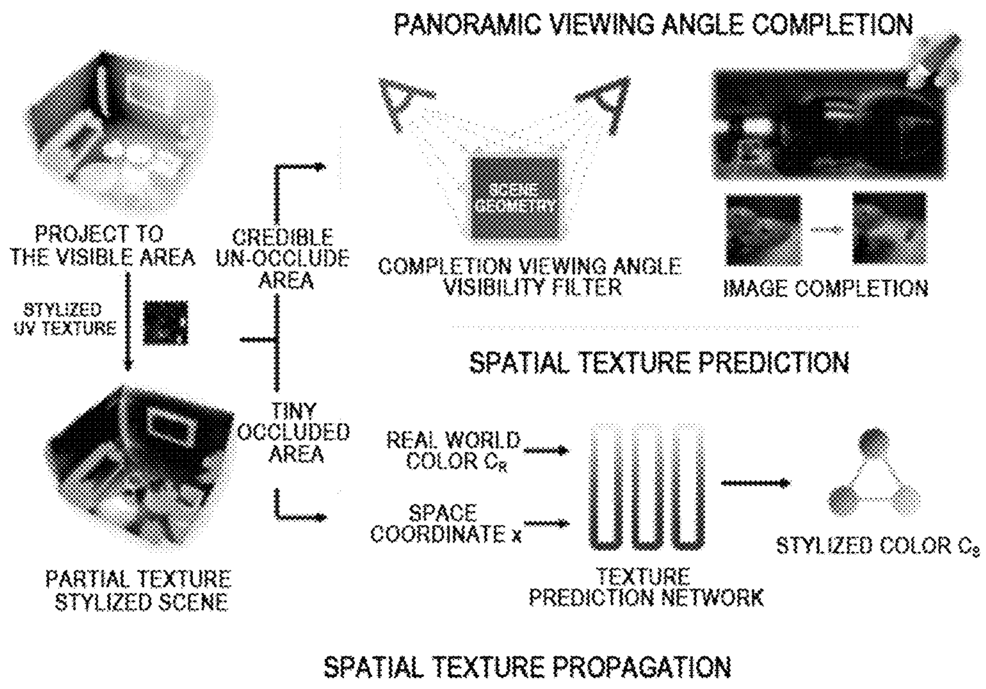

FIG. 5

110 OBTAIN A PROMPT WORD AND A SCENE MESH, THE PROMPT WORD BEING TEXT INFORMATION THAT IS PROVIDED BY A USER AND REPRESENTS A SCENE STYLE, AND THE SCENE MESH BEING A THREE-DIMENSIONAL MESH WITH A REAL TEXTURE GENERATED BASED ON A REAL SCENE RECONSTRUCTION

120 GENERATE A STYLIZED PANORAMIC TEXTURE MAP AT A CENTER POSITION OF THE SCENE MESH BASED ON THE PROMPT WORD

130 PROJECT A TEXTURE OF THE STYLIZED PANORAMIC TEXTURE MAP TO A VISIBLE AREA OF THE SCENE MESH TO OBTAIN A FIRST STYLIZED MESH TEXTURE MAPPING

140 PERFORM SPATIAL TEXTURE PROPAGATION PROCESSING ON THE FIRST STYLIZED MESH TEXTURE MAPPING TO FILL A NON-VISIBLE AREA OF THE SCENE MESH TO OBTAIN A SECOND STYLIZED MESH TEXTURE MAPPING

150 PACKAGE A VIRTUAL WINDOW, A PANORAMIC SKY BOX, THE SECOND STYLIZED MESH TEXTURE MAPPING AND AN ORIGINAL SCENE MESH TO GENERATE A TARGET VIRTUAL SCENE, AND DISPLAY THE TARGET VIRTUAL SCENE

FIG. 6

METHOD, APPARATUS, STORAGE MEDIUM, DEVICE AND PROGRAM PRODUCT FOR IMAGE PROCESSING

CROSS REFERENCE

The application claims priority to Chinese Patent Application No. 202311352097.8, filed on Oct. 18, 2023 and entitled "METHOD, APPARATUS, STORAGE MEDIUM, DEVICE AND PROGRAM PRODUCT FOR IMAGE PROCESSING", the entirety of which is incorporated herein by reference.

FIELD the disclosure relates to the technical field of image processing, in particular to a method, an apparatus, a storage medium, a device and a program product for image processing.

BACKGROUND

In the fields of virtual reality (VR), Mixed Reality (MR), and the like, personalized decoration of a user real-life scenario can be achieved by performing style transfer on three-dimensional scene representation, for example, a user's bed in a displayed virtual scene image is changed into a game style bed through a virtual reality device, and the ceiling is changed into a star sky style and the like, thereby providing a rich and immersive experience. For example, a typical three-dimensional scene representation may be a mesh. However, the current technology cannot automatically generate a stylized mesh texture mapping, and cannot ensure spatial consistency and mapping correctness, and is difficult to completely cover complex geometries in a real scene.

SUMMARY

Embodiments of the disclosure provide a method, an apparatus, a storage medium, a device and a program product for image processing, to automatically generate a stylized mesh texture mapping based on a prompt word provided by a user, meanwhile ensure spatial consistency, mapping correctness, and completely cover complex geometries in a real scene.

According to one aspect, an embodiment of the disclosure provides a method of processing image, where the method includes: obtaining a prompt word and a scene mesh, wherein the prompt word is text information that is provided by a user and represents a scene style, and the scene mesh is a three-dimensional mesh with a real texture generated based on a real scene reconstruction; generating a stylized panoramic texture map at a center position of the scene mesh based on the prompt word; projecting a texture of the stylized panoramic texture map to a visible area of the scene mesh to obtain a first stylized mesh texture mapping; and performing a spatial texture propagation processing on the first stylized mesh texture mapping to fill a non-visible area of the scene mesh to obtain a second stylized mesh texture mapping.

According to another aspect, an embodiment of the disclosure provides an apparatus for image processing, including:

- an obtaining unit, configured to obtain a prompt word and a scene mesh, wherein the prompt word is text information that is provided by a user and represents a scene style, and the scene mesh is a three-dimensional mesh with a real texture generated based on a real scene reconstruction;
- a first processing unit, configured to generate a stylized panoramic texture map at a center position of the scene mesh based on the prompt word;
- a second processing unit, configured to project a texture of the stylized panoramic texture map to a visible area of the scene mesh to obtain a first stylized mesh texture mapping;
- a third processing unit, configured to perform a spatial texture propagation processing on the first stylized mesh texture mapping to fill a non-visible area of the scene mesh to obtain a second stylized mesh texture mapping.

According to another aspect, an embodiment of the disclosure provides a computer-readable storage medium storing a computer program, which is adapted to be loaded by a processor to perform the method of processing image according to any of the foregoing embodiments.

According to another aspect, an embodiment of the disclosure provides a terminal device, comprising a processor and a memory, wherein the memory stores a computer program, and the processor is configured to invoke the computer program stored in the memory to perform the method of processing image according to any of the foregoing embodiments.

In another aspect, an embodiment of the disclosure provides a computer program product, comprising a computer program, which, when executed by a processor, implements the method of processing image according to any of the foregoing embodiments.

According to the embodiment of the disclosure, the prompt word and the scene mesh are obtained, the prompt word is text information provided by the user and represents a scene style, and the scene mesh is a three-dimensional mesh with real texture generated based on the real scene reconstruction; a stylized panoramic texture map is generated at the center position of the scene mesh based on the prompt word; the texture of the stylized panoramic texture map is projected to the visible area of the scene mesh to obtain a first stylized mesh texture mapping; and the spatial texture propagation processing is performed on the first stylized mesh texture mapping to fill the non-visible area of the scene mesh to obtain the second stylized mesh texture mapping. According to the embodiment of the disclosure, the stylized mesh texture mapping can be automatically generated based on the prompt words provided by the user, meanwhile, the spatial consistency, the mapping correctness can be ensured and the complex geometric structure in the real-life scenario can be completely covered.

BRIEF DESCRIPTION OF DRAWINGS

In order to more clearly illustrate the technical solutions in the embodiments of the disclosure, the accompanying drawings used in the description of the embodiments are briefly described below.

FIG. 5 is a schematic diagram of a fourth application scenario of a method of processing image according to an embodiment of the disclosure.

FIG. 6 is a second flowchart of a method of processing image according to an embodiment of the disclosure.

DETAILED DESCRIPTION

Figure 1:
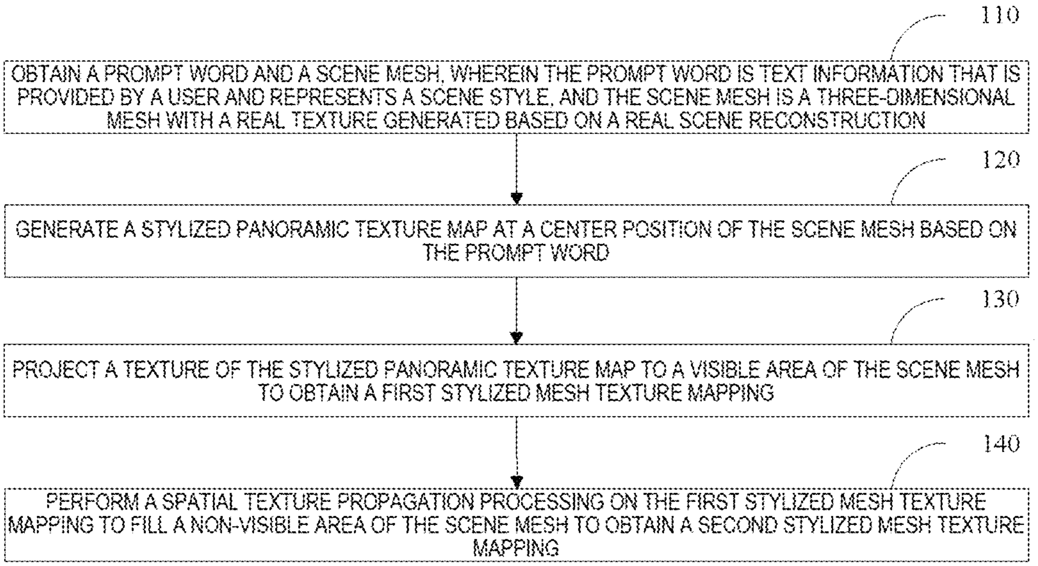
FIG. 1 is a first flowchart of a method of processing image according to an embodiment of the disclosure.

The technical solutions in the embodiments of the disclosure are clearly and completely described below with reference to the accompanying drawings in the embodiments of the disclosure. It should be apparent that the described embodiments are only some embodiments of the disclosure, and not all embodiments. All other embodiments, which can be obtained by a person skilled in the art without inventive step based on the embodiments of the disclosure, are within the scope of protection of the disclosure.

The embodiments of the disclosure provide a method and an apparatus, a computer-readable storage medium, a terminal device and a program product for image processing. Specifically, the method of processing image in the embodiment of the disclosure may be performed by a terminal device or by a server.

Embodiments of the disclosure may be applied to various application scenarios such as extended Reality (XR), Virtual Reality (VR), Augmented Reality (AR), Mixed Reality (MR), and the like.

First, some nouns or terms appearing in the process described in the embodiments of the disclosure are explained as follows.

A virtual scene is a virtual scene displayed (or provided) when an application runs on a terminal or a server. Optionally, the virtual scene is a simulated environment of a real world, or a virtual environment that is semi-simulated and semi-fictional, or a virtual environment that is purely fictional. The virtual scene is any of a two-dimensional virtual scene and a three-dimensional virtual scene. The virtual scene may be sky, land, ocean, etc., wherein the land includes environmental elements such as desert, city, etc. The virtual scene is a scene of a complete game logic of a virtual object, such as user control.

Extended Reality (XR) is a concept including Virtual Reality (VR), Augmented Reality (AR), and Mixed Reality (MR), representing an environment in which a virtual world is connected to a real world, and a technology in which a user can interaction in real time with the environment.

Virtual Reality (VR), technology for creating and experiencing a virtual world, a calculation and generation of a virtual environment is a multi-source information (the virtual reality mentioned herein includes at least visual perception, and may also include auditory perception, tactile perception, motion perception, even further including taste perception, olfactory perception, etc.), implementing simulation of a fused, interactive three-dimensional dynamic visual and physical behavior of a virtual environment, enabling a user to be immersed into a simulated virtual reality environment, and implementing an application of a plurality of virtual environments such as a map, a game, a video, an education, a medical, a simulation, a collaborative training, a sales, an assisted manufacturing, maintenance, and repair.

Augmented Reality (AR), in a process of capturing an image by a camera, a camera pose parameter of a camera in a real world (or referred to as a three-dimensional world and a real world) is calculated in real time, and a virtual element technology is added on an image collect by a camera according to the camera pose parameter. Virtual elements include, but are not limited to: images, videos, and three-dimensional models. An objective of the AR technology is to sleeve the virtual world on the real world for interaction.

Mixed Reality (MR), a simulated scenery where a computer created sensory input (e.g., a virtual object), and sensory input from a physical scenery or representations thereof are integrated, in some MR sceneries, computer created sensory input may be adapted to changes in sensory input from a physical scenery. Additionally, some electronic systems for presenting MR scenery may monitor orientation and/or position relative to physical scenery to enable virtual object to interaction with real objects (i.e., physical elements from physical scenery or representations thereof). For example, the system may monitor such that the virtual plant appears stationary relative to the physical building.

Augmented Virtuality (AV), a simulated scenery where a computer created scenery or a virtual scenery incorporate at least one sensory input from a physical scenery. The one or more sensory inputs from the physical scenery may be representations of at least one feature of the physical scenery. For example, a virtual object may exhibit a color of a physical element captured by one or more imaging sensors. As another example, the virtual object may exhibit characteristics consistent with actual weather conditions in the physical scenery, as identified via weather related imaging sensors and/or online weather data. In another example, an augmented reality forest may have virtual trees and structures, but animals may have features that are accurately reproduced from images taken on physical animals.

A virtual field of view, a region in a virtual environment that can be perceived by a user through a lens in a virtual reality device, and a field of view (FOV) of a virtual field of view is used to represent a perceived area.

The virtual reality device, the terminal implementing the virtual reality effect, may generally be provided as a form of glasses, a head mount display (HMD) and a contact lens, so as to realize visual perception and other forms of perception, and of course, the forms of the virtual reality device are not limited thereto, and may be further miniaturized or miniaturized as required.

The virtual reality device described in this embodiment of the disclosure may include, but is not limited to, the following types:

A computer end virtual reality (PCVR) device uses a PC end to perform related calculation and data output of a virtual reality function, and an external computer end virtual reality device uses data output by a PC end to achieve an effect of virtual reality.

The mobile virtual reality device supports setting a mobile terminal (such as a smart phone) in various manners (for example, a head-mounted display provided with a special card slot), performing related calculation of the virtual reality function by the mobile terminal by connecting with the mobile terminal in a wired or wireless manner, and outputting data to the mobile virtual reality device, for example, viewing the virtual reality video through the APP of the mobile terminal.

The integrated machine virtual reality device is provided with a processor for performing related calculation of virtual functions, so that the integrated machine virtual reality device has independent virtual reality input and output functions, does not need to be connected with a PC end or a mobile terminal, and is high in use degree of freedom.

UV is short for the texture mapping coordinate UVW (W coordinates are not commonly used), it definition the position coordinate information of each point on the mapping, the position of the gap between the point and the point is subjected to image smooth interpolation processing by the software, and is associated with the XYZ coordinates of the three-dimensional model, so as to determine the distribution position of the texture mapping; each three-dimensional model is composed of a plurality of faces, and the process of spreading the three-dimensional face on the two-dimensional canvas is called abduction UV. U and V represent horizontal and vertical coordinate axes, respectively. The UV map is a two-dimensional texture image.

In the fields of Virtual Reality (VR), Mixed Reality (MR), and the like, a real scene of a user is personalized and decorated by using a three-dimensional representation manner, for example, a user's bed in a displayed virtual scene image is changed into a game style bed by using a virtual reality device, a ceiling is changed into a starry style, and a rich and immersive experience may be provided. For example, the three-dimensional representation may be a mesh.

However, most current three-dimensional personalized solutions rely on materials manufactured in advance by the art designer, or the mesh surface area for texture mapping is manually constrained using three-dimensional modeling software (e.g. AI-based texture mapping generation tools), and the automatic full-scene personalized texture generation can not be simply carried out according to the text input of the use; in addition, current text generation image solutions (such as a text-to-image model) can only be applied to a 2D image of a single camera viewing angle (for example, a depth-based text-to-image control model), the current text-driven automatic Mesh texture generation scheme (for example, a multi-view 2D image corresponding to 3D is generated firstly, for example, generated by rotating around the center of an object, and then the 2D image texture is automatically mapped to the 3D Mesh) can only be applied to the object level, and cannot completely map to the Mesh of a three-dimensional scene under the conditions that spatial consistency (for example, wallpaper with uniform color at 360 degrees) and the mapping correctness (for example, the texture of a chair leg is mapped on the back ground) are ensured For example, the AI texture mapping generation tool may be a plug-in for texture generation and painting using an AI model in free open-source three-dimensional graphical image software, the principle of which is to project a mapping from a view angle.

For example, the text-to-image model may be a text-to-image model based on a latent diffusion model (LDMs). The principle is that images can be generated from text descriptions as input, or the image and the text description can be used as input to modify the image.

For example, the text-to-image control model may be a neural network structure that controls the text-to-image model by adding additional conditions. The method for enhancing stable diffusion is provided, and the generated image can be closer to the input image by using input condition control in the text-to-image generation process At present, the image texture generation algorithm cannot be applied to a mesh on a three-dimensional scene level, which mainly has three technical difficulties:

1. A global consistent high-definition texture generation: current method can only generate a local texture or texture of a single object, and cannot generate a coherent scene texture at a viewing angle of 360° (for example, it is ensured that the wall wallpaper of the scene is a coherent color, or a bed across multiple camera viewing angles has consecutive textures, etc.), and the definition is not high enough (for example, usually only 512*512 resolution).
2. The generated texture and geometric difficult-to-fit: current geometric texture generation, although depth conditioning can be performed by using the text-to-image control model, in the application of the scene level, due to the fact that many slim complex geometries (such as chair legs and the like) exist in the real scene, the generated textures often cannot correspond to these geometric structures, which leads to the situation that when automates texture projection (the texture of the 2D image is mapped to the 3D Mesh), a misalignment occurs.
3. A complex geometric structure in a real scene has a complex occlusion relationship, and it is difficult to be completely covered by using the texture projection: for example, a gap between the bottom of the couch and the ground is very small, and it is difficult to generate a re-projection by using a texture at the view angle of the camera to map texture to the mesh.

Therefore, there is a need for a solution capable of automatically generating a stylized mesh texture mapping based a prompt word provided by a user, while ensuring spatial consistency, map correctness, and completely covering complex geometries in a real scene.

The embodiments of the disclosure provide a method and an apparatus, a storage medium, a device and a program product for image processing, and can generate a stylized mesh texture mapping of a meaningful and attractive real-life scene based on a prompt word provided by a user, and meanwhile, the semantic consistency and the spatial coherence are maintained (for example, the furniture appears to be still a furniture type, but is presented in different texture styles). In order to meet the requirement of global consistency, in the embodiment of the disclosure, in panoramic texture space, a top-down manner is used to perform texture generation on the scene mesh. Specifically, in the embodiment of the disclosure, in the panoramic texture generation process, an initial stylized panoramic texture map is generated firstly at the center position of the scene mesh, then the texture of the stylized panoramic texture map is projected to the visible area of the scene mesh to obtain a first stylized mesh texture mapping, and then the texture is propagated to the rest non-visible areas of the scene to obtain a second stylized mesh texture mapping. The finally generated second stylized mesh texture mapping has been baked into the scene mesh by a two-dimensional texture (UV) mapping, and can be used to immersive experience stylized scenes on the head-mounted display devices such as VR, XR, AR, etc.

Detailed descriptions are given below. It should be noted that the description sequence of the following embodiments is not limited to the embodiment priority.

The embodiments of the disclosure provide a method of image processing, and the method may be performed by a terminal or a server, or may be jointly performed by a terminal and a server. The embodiment of the disclosure is explained taking an example in which the method of processing image is executed by a terminal (terminal device).

Referring to FIG. 1 to FIG. 8, FIG. 1 and FIG. 6 are schematic flowcharts of a method of processing image according to an embodiment of the disclosure. FIG. 2 to FIG. 5 and FIG. 7 to FIG. 8 are a schematic diagram of an application scenario of a method of processing image according to an embodiment of the disclosure. The method may be applied to a terminal device, and the terminal device may include any of an extended reality device, a virtual reality device, an augmented reality device, and a mixed reality device. The method includes:

Step 110: Obtain a prompt word and a scene mesh, the prompt word being text information that is provided by a user and represents a scene style, and the scene mesh being a three-dimensional mesh with a real texture generated based on a real scene reconstruction.

For example, obtaining the prompt word P provided by the user and real reconstruction scene meth (Textured Mesh) with real texture. Specifically, the prompt word P provided by the user may be obtained through user input or automatic identification technology, and the prompt word P may be text information. At the same time, a real reconstructed scene mesh with a real texture is obtained by 3D scanning or image processing technology.

Step 120: generate a stylized panoramic texture map at a center position of the scene mesh based on the prompt word.

In step 120, the stylized panoramic texture image may be obtained by performing texture stylization based on the scene of the panoramic view, specifically, by using the personalized processing of text driving in the panoramic view space, the stylized panoramic texture image with consistent scene height is achieved.

In some embodiments, the stylized panoramic texture map comprises a style priority panorama, and generate a stylized panoramic texture map at a center position of the scene mesh based on the prompt word comprises:

- generate the style priority panorama at the center position of the scene mesh based on the prompt word;
- determine the stylized panoramic texture map based on the style priority panorama.

In some embodiments, the generating the style priority panorama at the center position of the scene mesh based on the prompt word comprises:

- render a true color map and a depth map of a real scene at the center position of the scene mesh;
- process the prompt word, the true color map and the depth map by using a pre-trained diffusion model to generate an initial style priority panorama;
- enlarge the initial style priority panorama by a predetermined magnification factor based on a super-resolution amplification technology to obtain the style priority panorama, wherein a resolution of the style priority panorama is greater than a resolution of the initial style priority panorama.

The prompt word P, the true color (RGB) map $I_P$ and the depth map D are processed by using a pre-trained diffusion model to generate a seamless and high-resolution style priority panorama, and the style priority panorama is determined as a stylized panoramic texture map.

For example, the stylized panoramic texture map may include a style priority panorama, and step 120 may be implemented by step 121 to step 123, as follows:

Step 121: render a true color map and a depth map of a real scene at the center position of the scene mesh.

Rendering the real color (RGB) map $I_P$ and the depth map D of the real scene at the center position of the scene mesh. Specifically, the RGB map $I_P$ and the depth map D may be extracted from the Textured Mesh. The RGB map $I_P$ represents the color information of each pixel point in the surface of the scene mesh; and the depth map D represents the distance from each pixel point in the surface of the scene mesh to the camera center c.

The true color map refers to an image presented in a real color, usually an image captured by a color camera or a VCR, these images include detail information such as color and texture of an object in the scene, and visual perception of a real scene may be provided. The depth map refers to an image with depth information, and is usually obtained by a depth sensor (for example, a ToF camera, a structured light camera, a stereo vision camera, etc.); in the embodiment of the disclosure, the depth map may be directly obtained through mesh rendering at a moment of a known scene mesh. The depth map may provide distance information of objects from the camera in the scene, typically represented in the form of grayscale images or color codes.

Step 122, process the prompt word, the true color map and the depth map by using a pre-trained diffusion model to generate an initial style priority panorama.

The pre-trained diffusion model is obtained by pre-training through a panorama.

Specifically, in order to generate a style priority panorama to achieve the required high resolution, the disclosure designs a generation solution from coarse to fine.

First, the RGB map $I_P$ and the depth map D are used as input condition controls of the diffusion model (using the text-to-image control model technology) to generate a low-resolution initial style priority panorama $\hat{I}_S$.

$$\hat{I}_S = F_c(P; D, \mathcal{E}(I_P)) \quad (1)$$

where $F_C$ is a diffusion model with multiple condition control, $\varepsilon(I_P)$) is a soft edge (SoftEdge) map extracted with a pixel difference network (PiDiNet), P is a prompt word, and D is a depth map.

For example, a size of the low-resolution initial style priority panorama $\hat{I}_S$ may be 1024*512.

For example, the RGB map and the depth map D may be controlled as input conditions of the diffusion model by using an end-to-end neural network (a text-to-image control model).

The pixel difference network (PiDNet) is configured to perform effective edge detection.

In step 123, enlarging the initial style priority panorama by a predetermined magnification factor based on a super-resolution amplification technology to obtain the style priority panorama, wherein a resolution of the style priority panorama is greater than a resolution of the initial style priority panorama.

For example, using a super-resolution amplification technology, a low-resolution initial style priority panorama $\hat{I}_S$ enlarged by a predetermined magnification factor (for example, three times) to obtain a high-resolution style priority panorama $\hat{I}_{SL}$.

In the inference process, an asymmetric tiling strategy may be used to replace the 2D convolution kernel filling mode of the UNet structure in the diffusion model by using an annular filling, so as to ensure that the left image and the right image of the panorama are continuous (for example, keeping the same tone and continuous pattern on both sides of the wall and the furniture).

The UNet structure is a convolutional neural network used for image segmentation, the UNet network is composed of a contraction path and an extension path, and a jump connection structure is provided between the contraction path and the network layer corresponding to the extension path.

The panoramic texture generation solution described in step 120 can be widely applied to various applications requiring panoramic texture generation, such as game production, virtual reality, augmented reality and other scenes, which not only considers the color and shape of the texture, but also combines the prompt word and depth information provided by the user, can quickly and accurately generate high-quality panoramic texture, and improves the performance of related applications and user experience.

In some embodiments, the stylized panoramic texture map comprises the style priority panorama and an alignment priority panorama, and the determining the stylized panoramic texture map based on the style priority panorama comprise:

generate the alignment priority panorama based on the prompt word, the true color map and the depth map; and perform texture mixing on the style priority panorama and the alignment priority panorama to generate the stylized panoramic texture map.

In some embodiments, the generating the alignment priority panorama based on the prompt word, the true color map and the style priority panorama comprises:

denoise the true color map to obtain a denoised true color map;

process the prompt word, the denoised true color map and the style priority panorama using the diffusion model to generate an initial alignment priority panorama;

enlarge the initial alignment priority panorama by a predetermined magnification factor based on a super-resolution amplification technology to obtain the alignment priority panorama, wherein a resolution of the alignment priority panorama is greater than a resolution of the initial alignment priority panorama.

In some embodiments, the performing texture mixing on the style priority panorama and the alignment priority panorama to generate the stylized panoramic texture map comprises:

generate a first depth edge filter mask based on an edge detection result at a jump of the depth map, wherein the first depth edge filter mask is configured to represent a pixel area in which the style priority panorama and the alignment priority panorama are mixed; and mix textures of the style priority panorama and the alignment priority panorama using a Poisson image editing algorithm based on the first depth edge filter mask to obtain the stylized panoramic texture map.

Although the RGB map and the depth map are controlled by using the text-to-image control model as input conditions of the diffusion model, the diffusion model may be effectively guided to generate a texture that is substantially aligned with the scene mesh, but in the texture generation task of the scene level, due to the complex geometry of the real scene, the alignment of the initial generated texture often cannot meet the requirement. In addition, if the strong row requires that the generated texture is aligned with the real scene (for example, implementing the image-to-image by using a diffusion model with a lower denoising intensity), it is often also possible to cause the generated stylized panorama to be blurred or the style is not beautiful; thus, in step 120, a double-path texture alignment scheme may also be used, and the double-path textures are mixed by respectively generating a double-path texture of the style priority panorama and the alignment priority panorama, and then using edge detection at a jump of the depth map as a reference, so as to obtain a stylized panoramic texture map.

Figure 2:
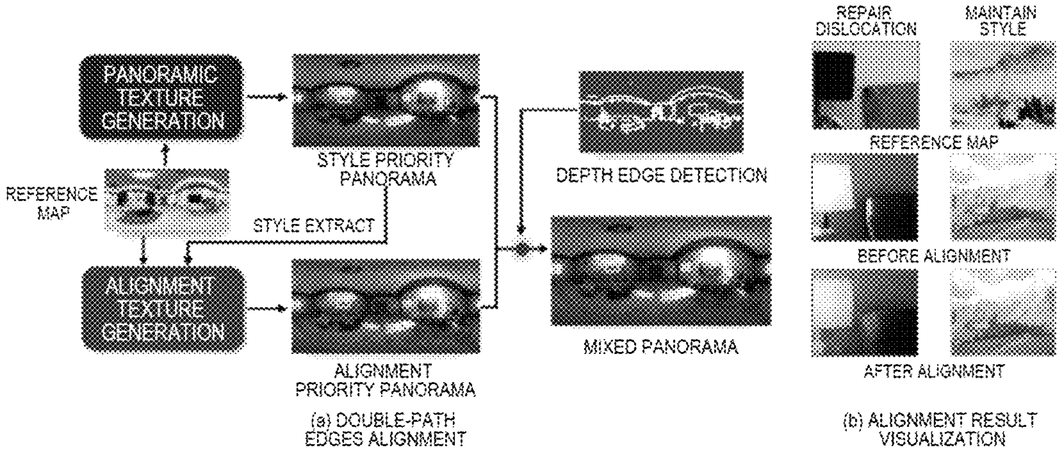
FIG. 2 is a schematic diagram of a first application scenario of a method of processing image according to an embodiment of the disclosure.

Referring to the schematic diagram of the first application scenario shown in FIG. 2, in a schematic diagram of double-path edge alignment shown in FIG. 2(*a*), through the panoramic texture generation step, the style priority panorama is generated by the reference map, then alignment texture generation is performed based on the reference map and style information obtained by style extraction from the style priority panorama, an aligned priority panorama is obtained, and the textures of the style priority panorama and the alignment priority panorama are mixed based on the first depth edge filter mask generated by the depth edge detection, to obtain a mixed panorama (stylized panoramic texture map). In the schematic diagram of the alignment result visualization shown in FIG. 2(*b*), through double-path edge alignment, compared with the image before alignment, the aligned image can repair dislocation and keep style.

For example, the stylized panoramic texture map includes a style priority panorama and an aligned priority panorama, and step 120 may also be implemented by step 121 to step 127. Specifically, the style priority panorama may be generated by the following steps 121 to 123, then the aligned priority panorama is generated by the following steps 124 to 125, and then mixed double-path texture is achieved through steps 126 to 127 to obtain the stylized panoramic texture map. Specifically:

Step 121, render a true color map and a depth map of a real scene at the center position of the scene mesh.

Step 122, process the prompt word, the true color map and the depth map by using a pre-trained diffusion model to generate an initial style priority panorama.

In step 123, enlarging the initial style priority panorama by a predetermined magnification factor based on a super-resolution amplification technology to obtain the style priority panorama, wherein a resolution of the style priority panorama is greater than a resolution of the initial style priority panorama.

For specific implementations of step 121 to step 123, reference may be made to the specific description in the foregoing embodiments, and details are not described herein again.

Step 124, generate an initial alignment priority panorama by inputting the prompt word, the true color map, the depth map and the style priority panorama into the diffusion model for processing.

Specifically, the prompt word, the true color (RGB) map, the depth map and the style priority panorama are used as input, and the initial alignment priority panorama is generated by using the diffusion model. In order to maintain the consistency of the style, the style information T ($I_S$) extracted from the style priority panorama will be used as part of the condition control by using the image-to-image style control module.

In order to generate the initial alignment priority panorama $\hat{I}_A$, the disclosure performs denoising on the panoramic RGB map of the real world based on the edge detection algorithm, and then uses the condition control technology of the text-to-image control model to generate the initial alignment priority panorama $\hat{I}_A$.

$$\hat{I}_A = F_c(P; C(I_P), \mathcal{T}(I_S)) \quad (2)$$

where $F_C$ is a diffusion model with multi-condition control; P is a prompt word; C ($I_P$) is an edge detection result obtained by performing edge detection on the true color map $I_P$ based on an edge detection algorithm, and is used for denoising the true color map $I_P$; and T ($I_S$) is style information extracted from the style priority panorama by using the image-to-image style control module, and is used for maintaining consistency of the style.

The edge detection algorithm used in the embodiments of the disclosure is a method of detecting an edge by using a multi-level edge detection algorithm. For detecting edges or contours in an image. The basic idea of this algorithm is to first find an obvious edge in the image, and then determine the position and direction of the edge by calculating the gradient of the pixel in the image.

The image-to-image style control module is a function module for controlling the style and semantics of the generated image area to follow the original image in the large-scale image diffusion model, and commonly used for controlling algorithms to generate new details that follow the original image details in tasks such as image enlargement and detail restoration.

Step 125: enlarge the initial alignment priority panorama by a predetermined magnification factor based on a super-resolution amplification technology to obtain the alignment priority panorama, wherein a resolution of the alignment priority panorama is greater than a resolution of the initial alignment priority panorama.

Specifically, in order to make the initial alignment priority panorama $\hat{I}_A$ be the same size as the style priority panorama $\hat{I}_{SL}$, the initial alignment priority panorama $\hat{I}_A$ is enlarged to the same size as the style priority panorama based on a predetermined magnification factor (for example, three times) by using a super-resolution amplification algorithm, to obtain the alignment priority panorama $\hat{I}_{AL}$.

Step 126: generate a first depth edge filter mask based on an edge detection result at a jump of the depth map, wherein the first depth edge filter mask is configured to represent a pixel area in which the style priority panorama and the alignment priority panorama are mixed.

Specifically, since the alignment dislocation problem tends to occur where the scene depth changes significantly, the depth edge jump region may be detected from the depth map to generate the first depth edge filter mask, which may be configured to represent a pixel area in which the style priority panorama and the alignment priority panorama are mixed. To ensure that the generated texture does not crack or blur at the depth edge, a jump region is detected at the depth edge as a reference. A first depth edge filter mask is generated based on the edge detection result at the jump of the depth map by using an image processing algorithm. The first depth edge filter mask may be configured to indicate which pixel regions should be mixed, which pixel regions should be left intact.

This step mainly identifies the depth edge by analyzing pixel value changes in the depth map. Generally, the depth edge corresponds to the contour or border of the object in the image, and the pixel values of these regions may change significantly. These depth edges may be detected and a first depth edge filter mask may be generated by setting appropriate thresholds.

Step 127, mix textures of the style priority panorama and the alignment priority panorama using a Poisson image editing algorithm based on the first depth edge filter mask to obtain the stylized panoramic texture map.

Specifically, the generated first depth edge filter mask may be applied to the style priority panorama and the alignment priority panorama, and then the double-path texture is mixed using the Poisson image editing algorithm. This can significantly mitigate geometric texture misalignment issues while maintaining the required stylized details unchanged.

Once the depth edge is detected, the texture on both sides of the depth edge may be mixed by using a Poisson image editing algorithm. The Poisson image editing method mainly satisfies a certain boundary condition, so that the gradient field of the two-dimensional function to be solved in the region are as similar as possible. The boundary condition herein means that the function value is equal to the value of the target image on the boundary. By solving the two-dimensional function meeting the boundary condition, the stylized panoramic texture map after mixing the style priority panorama and the alignment priority panorama can be obtained.

Figure 3:
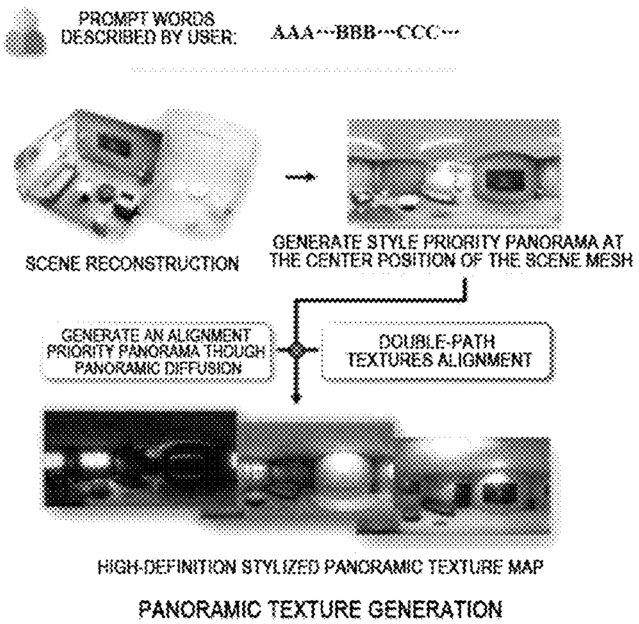
FIG. 3 is a schematic diagram of a second application scenario of a method of processing image according to an embodiment of the disclosure.

Referring to the second application scenario schematic diagram shown in FIG. 3, in the panoramic texture generation process of step 120, the prompt words "AAA . . . BBB . . . CCC . . . " described by the user are obtained; then a three-dimensional scene mesh with real texture generated based on the real scene is reconstructed; then a style priority panorama is generated at the center position of the scene mesh based the prompt words; then panoramic diffusion is performed to generate an alignment priority panorama; and then the style priority panorama and the alignment priority panorama are subjected to double-path texture alignment, thereby generating a high-definition stylized panoramic texture map.

Step 130: project a texture of the stylized panoramic texture map to a visible area of the scene mesh to obtain a first stylized mesh texture mapping.

After the stylized panoramic texture map obtained by step 120, the texture of the stylized panoramic texture map may be projected to the visible area of the three-dimensional scene mesh through the UV mapping in the panoramic space, to obtain the first stylized mesh texture mapping.

In some embodiments, step 130 may be implemented by step 131 to step 135, specifically:

Step 131: obtain a two-dimensional texture image of the scene mesh and a texture coordinate corresponding to each pixel in the two-dimensional texture image.

The two-dimensional texture image is a UV map. In step 131, a UV map of the scene mesh and texture coordinates corresponding to each pixel in the UV map are obtained. This step may be implemented by a software tool or algorithm, for example, the 3D modeling tool may directly generate the UV map and the texture coordinates when creating the three-dimensional model.

Step 132, compute a spatial coordinate of each pixel of the two-dimensional texture image in a three-dimensional space by an interpolation based on the two-dimensional texture image and the texture coordinate.

For example, the spatial coordinates of each pixel of the UV map in the three-dimensional space are computed by interpolation based on the UV map and the texture coordinates. The specific interpolation method may adopt methods such as gravity center interpolation.

For example, based on the texture coordinates of each valid pixel p in the UV map, the spatial coordinate x of each pixel p is computed by interpolation:

$$x = Interp(MapTex(TexCoord(p), \{T\})), \quad (3)$$

where TexCoord(p) is the texture coordinate of each pixel p, {T} is the triangle of the scene mesh Mesh, MapTex (•) is a triangle vertex that maps the texture coordinates to the weight of the gravity center, and each spatial coordinate x is obtained by interpolation the center of gravity from the vertex of the triangle.

Step 133: compute a ray direction between each pixel of the two-dimensional texture image and a camera based on the spatial coordinate of each pixel of the two-dimensional texture image in the three-dimensional space, and mapping the ray direction onto the stylized panoramic texture map by an equidistant cylindrical projection.

For the spatial coordinates of each pixel in the three-dimensional space, the ray direction between each pixel and the camera is computed, and the ray direction is mapped onto the stylized panoramic texture map through equidistant cylindrical projection.

In this step, the ray direction from the coordinate c of the center position of the camera through the spatial coordinate x of the pixel is computed based on the spatial coordinate x of each pixel p and the coordinate c of the center position of the camera, wherein the ray direction d=c−x/||c−x||; then, the ray direction is mapped onto the stylized panoramic texture map by an equirectangular projection, which is a method for projecting an object in a three-dimensional space onto a two-dimensional plane, and the method can keep the shape and relative position of the object unchanged.

Step 134: determine visibility information of each pixel of the two-dimensional texture image under observation of the camera to generate a first visibility mask based on the visibility information, wherein the visibility information is configured to represent whether a spatial coordinate of each pixel of the two-dimensional texture image is visible when observed from a coordinate of a center position of the camera.

In this step, visibility information of each pixel under observation of the camera is determined based on the distance between each pixel and the camera and the depth information of the rendering scene, and then the first visibility mask is generated base on the visibility information. The specific visibility test method may adopt methods such as depth test.

For example, for the spatial coordinate x of each pixel p, the observation distance of each pixel p is compared with the depth information of the rendering scene to determine visibility information of each pixel in the camera observation, and the visibility information is used to represent whether the spatial coordinate x of the pixel p is visible when observed from the coordinate c of the center position of the camera. The observation distance of each pixel p is the distance between the spatial coordinate x of each pixel p and the coordinate c of the center position of the camera.

According to the method, all pixels of the UV map are traversed through the visibility test, visibility information of each pixel under observation of the camera is obtained, and a first visibility mask $M_{init\_vis}$ is formed on the UV space, as shown below.

$$M_{init\_vis}(p) = \begin{cases} 1, & \text{if } \|p - x\| < \epsilon \\ 0, & \text{otherwise} \end{cases}. \quad (4)$$

where the distance threshold ε=0.01.

Step 135: assign a panoramic color of the stylized panoramic texture map to a two-dimensional texture space based on the first visibility mask and the ray direction, to project a texture of the stylized panoramic texture map to the visible area of the scene mesh, to obtain the first stylized mesh texture mapping.

The two-dimensional texture space is a UV space. In step 135, the panoramic color of the stylized panoramic texture map is assigned to the UV space based on the first visibility mask and the ray direction. In this step, the panoramic color is assigned to the UV space based on the first visibility mask and the ray direction, and the operation of projecting the panoramic texture onto the three-dimensional mesh is completed. The specific assignment method may be designed according to actual needs.

In this step, the panoramic color of the stylized panoramic texture map is assigned to the UV space based on the first visibility mask $M_{init\_vis}$ and the corresponding ray direction d, and the texture of the stylized panoramic texture map is projected to the visible area of the three-dimensional scene mesh to obtain the operation of the first stylized mesh texture mapping, to implement partial texture stylization of the scene, and improve the effect and quality of texture mapping.

Step 140: perform spatial texture propagation processing on the first stylized mesh texture mapping to fill a non-visible area of the scene mesh to obtain a second stylized mesh texture mapping.

In step 140, the completion image may be obtained based on the spatial texture propagation of the multi-view panoramic view completion, specifically, the texture of the previous occlusion region is filled through the view completion algorithm under the panorama, to obtain the completion image. Then, filling the non-visible area in the completion image based on the spatial texture prediction network to obtain the second stylized mesh texture mapping, may be specifically: pre-learning from the current texture stylized map by using the spatial texture prediction network, and predicting a reasonable texture of the non-covered region of the texture.

In step 130, after the texture of the stylized panoramic texture map is projected to the visible area of the three-dimensional scene mesh to obtain the first stylized mesh texture mapping, some uncovered areas in the first stylized mesh texture mapping need to be filled. The disclosure proposes separate policies for regions of different visibility. Specifically, in step 140, panoramic viewing angle texture completion (Panoramic Texture Inpainting) may be first performed on the 2 credible un-occluded viewing angles of the first stylized mesh texture mapping (regions without complex occlusion at the new viewing angle) to obtain the completion mapping, and then the spatial texture prediction network is used to fill remaining slim geometries in the completion image or regions with complex occlusions to obtain the second stylized texture mapping.

In some embodiments, step 140 may be implemented by step 141 to step 142, specifically:

Step 141: perform panoramic viewing angle texture completion on the first stylized mesh texture mapping to obtain a completion image.

In some embodiments, the performing panoramic viewing angle texture completion on the first stylized mesh texture mapping to obtain a completion image comprises:

performing a dilation processing and a blurring processing on the first stylized mesh texture mapping to obtain a panoramic completion mask;

processing the prompt word, the first stylized mesh texture mapping, the depth map, and the panoramic completion mask by using an image completion model to generate an initial completion image;

obtaining a second depth edge filter mask, a security observation mask, and a second visibility mask, wherein the second depth edge filter mask is configured to filter an area with sudden depth change in the initial completion image, the security observation mask is configured to filter an area in the initial completion image in which an incident viewing angle from the camera to a mesh surface is less than a preset angle and/or an area in the initial completion image in which a distance between a surface point of a corresponding mesh surface and the camera is greater than a preset distance, and the second visibility mask is configured to filter a visible pixel area in the initial completion image when observed from a coordinate of a center position of a camera in a completion position;

determining a trusted mask based on an intersection of the depth edge filter mask, the security observation mask and the visibility mask; and assigning a panoramic texture of the initial completion image to a two-dimensional texture of the first stylized mesh texture mapping based on the trusted mask to obtain a completion image, wherein a two-dimensional texture of the first stylized mesh texture mapping is obtained by multiplexing the first visibility mask.

In step 141, panoramic viewing angle texture completion is performed on the first stylized mesh texture mapping to obtain a completed image. In this step, partial texture stylized filled mesh in the first stylized mesh texture mapping are provided, and then panoramic viewing angle texture completion is implemented in the panoramic space.

First, for each completion viewpoint, the panorama completion mask $M_{inp}$ is determined based on the new camera position. Specifically, the first visibility mask $M_{init\_vis}$ of the UV space may be regarded as UV texture for multiplexing, and the panoramic image is rendered on the current viewpoint, and then the image is expanded and blurred to obtain the panoramic completion mask $M_{inp}$.

Then, the current depth map D is used to control the image completion model $F_{inp}$ to generate an initial completion image $\hat{I}_{inp}$, as shown below:

$$\hat{I}_{inp} = F_{inp}(P, \hat{I}_M; D, M_{inp}), \tag{5}$$

where $\hat{I}_M$ is the rendering panoramic image with partial texture mesh; $\hat{I}_{inp}$ is an initial completion image, completion result output after image completion is performed on the image completion model $F_{inp}$; P is a prompt word; and D is a depth map.

Then, when the initial completion image $\hat{I}_{inp}$ is generated, factors such as a region in which the depth suddenly changes in the initial completion image, a small incident viewing angle (an incident view angle of the camera to the mesh surface in the initial completion image is less than a preset angle) or a too far surface point (the distance between the surface point of the corresponding mesh surface in the initial completion image and the camera is greater than a preset distance), and visibility of the perspective of the completion position camera are considered, thereby ensuring credible texture projection. Finally, the completed panoramic texture is assigned to the stylized UV texture resulting in a completed image, further filling the partially stylized scene.

The initial completion image $\hat{I}_{inp}$ is not completely projected into the stylized UV texture, but only the trusted region is filtered through visibility information of the UV space. Optionally, filtering may be performed by designing three UV spatial masks to ensure credible texture projection. First, the second depth edge overmask $M_{dep\_edge}$ may be used to filter an area with sudden depth change in the initial complement image $\hat{I}_{inp}$, and the depth edge jump area may be detected from the depth map to generate the second depth edge overmask $M_{dep\_edge}$. Secondly, the security observation mask $M_{safe\_view}$ may be formed by filtering a small incident viewing angle (an incident view angle is less than a preset angle, for example, an incident view angle is less than 10°) or a too far surface point (a distance between the surface point and the camera is greater than a preset distance, for example, a distance between the surface point and the camera is greater than 2.5 m) in the initial completion image $\hat{I}_{inp}$. Then, the visibility test may be performed based on the camera view angle of the completion position to construct the second visibility mask $M_{inp\_vis}$ of the completion viewing angle, where the second visibility mask $M_{inp\_vis}$ may be constructed using the above formula (4). According to the method, the trusted texture projection area in the UV space is realized by combining above all the masks as follows (6):

$$M_{conf} = M_{dep\_edge} \cap M_{safe\_view} \cap M_{inp\_vis}, \tag{6}$$

where $M_{conf}$ is a combined trusted mask, representing a trusted texture projection area in the UV space.

This design avoids view-based occlusion problems since all masks are built in the UV space rather than being built in a certain camera perspective or panoramic view. Finally, the panoramic texture of the initial completion image is assigned to the UV texture of the first stylized mesh texture mapping using the trusted mask $M_{conf}$ to obtain a completion image, further filling the partially stylized scene with more textures.

Step 142: fill a non-visible area in the completion image by using a spatial texture prediction network to obtain a second stylized mesh texture mapping, wherein the non-visible area comprises at least one of the following: a fine geometric area and an occluded area.

In some embodiments, the filling a non-visible area in the completion image by using a spatial texture prediction network to obtain a second stylized mesh texture mapping comprises:

providing spatial coordinates and real world colors of all pixels in the two-dimensional texture image of the scene mesh to the spatial texture prediction network to predict a target color;

obtaining a third visibility mask by combining the first visibility mask and the second visibility mask;

fusing the predicted target color to the non-visible area in the completion image through the third visibility mask to obtain the second stylized mesh texture mapping, wherein, the spatial texture prediction network is used to fill remaining slim geometries or regions with complex occlusion in the completion image to obtain the second stylized mesh texture mapping.

In the prediction stage, the spatial coordinate x of all effective UV pixels and the real world color CR are provided to the spatial texture prediction network to predict the color. After prediction, predicted color may be fused into the partially texture mesh by the accumulated visibility mask $M_{accu}$, resulting in a fully stylized scene.

To further fill unobserved or unmapped regions in the scene level mesh texture of the completion image, a spatial texture prediction network may be designed in step 142, the target of the texture prediction being a learning style map from the partially stylized scene, and then smoothly prediction a reasonable texture of the non-visible area.

First, real-world colors CR and stylized color Cs are lifted from the corresponding UV texture to spatial coordinates x.

In the training stage, a spatial texture prediction network $F_{Imit}$, a network input space coordinate x and a real world color $C_R$ from a partial texture scene are learned, and supervision of the L2 loss function is performed by using the currently visible stylized color Cs, as shown in the following formula (7):

$$\mathcal{L}_{imit} = \|\hat{C}_S - C_S\|_2, \text{ where } C_S = F_{Imit}(\gamma(x), C_R) \tag{7}$$

where γ(•) is the NeRF based position encoding technique, $\hat{C}_S$ is a predict color.

Then, in the prediction stage, the spatial coordinate x of all valid UV pixels and the real world color CR are provided to the spatial texture prediction network to predict the target color $\hat{C}_S$.

Finally, the predicted target color ĈS is fused to mesh of partial texture of completion image though the accumulated third visibility mask $M_{accu}$ to obtain the second stylized mesh texture mapping, and finally a fully stylized scene is generated.

The third visibility mask $M_{accu}$ may be obtained by combining the first visibility mask $M_{init\_vis}$ and all the second visibility mask $M_{inp\_vis}$.

Figure 4:
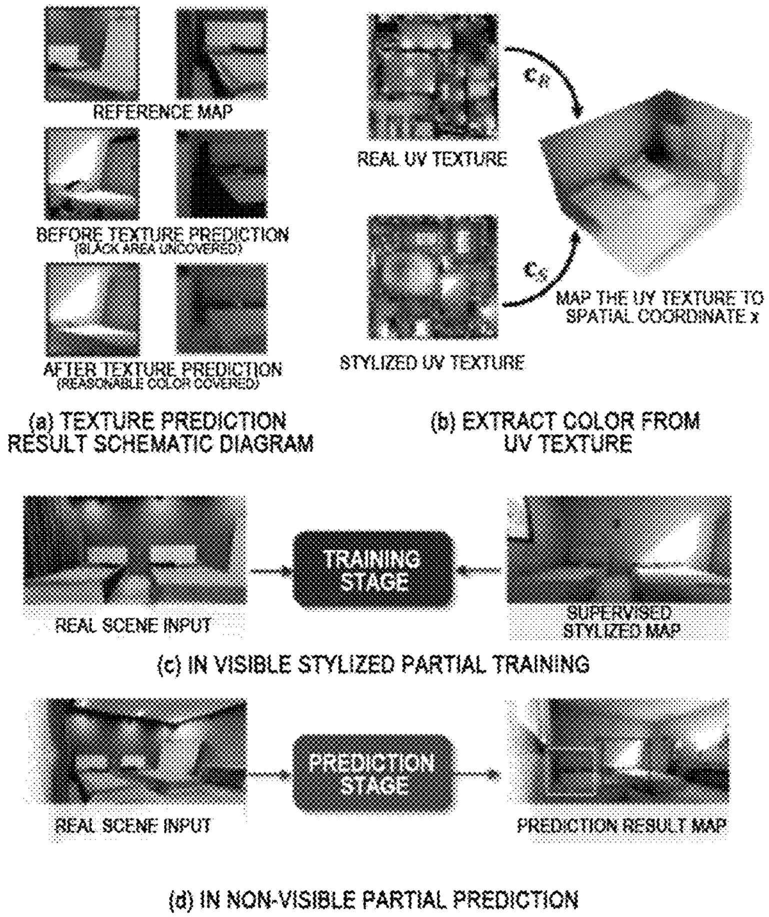
FIG. 4 is a schematic diagram of a third application scenario of a method of processing image according to an embodiment of the disclosure.

Referring to the schematic diagram of the third application scenario shown in FIG. 4, in step 142, a spatial texture prediction network is designed, as shown in the schematic diagram of the texture prediction result shown in FIG. 4(*a*), there is a pillow and a sheet in the reference image of the real scene provided in FIG. 4(*a*), Before texture prediction is performed on a completion image corresponding to the reference image, the black areas near the pillow, the cabinet and the like are not covered with colors, and after the texture prediction is performed, the original black areas in the image are covered with reasonable colors. In the schematic diagram of color extraction from UV texture as shown in FIG. 4(*b*), the real world color $C_R$ of the real UV texture and the stylized color $C_S$ of the stylized UV texture are mapped from the corresponding UV textures to the spatial coordinates x. As shown in FIG. 4(*c*), in the schematic diagram of the visible stylized partial training, in the training stage, the real world color $C_R$ of the real scene is input into the spatial texture prediction network, and the currently visible stylized color $C_S$ is used to supervise the L2 loss function to obtain a supervised stylized map. As shown in FIG. 4(*d*), in the schematic diagram of partial prediction not visible, in the prediction stage, the spatial coordinate x of all effective UV pixels and the real world color $C_R$ of the real scene are provided to the spatial texture prediction network to predict the target color $\hat{C}_S$, and the prediction result map is output, and in the prediction result map, the uncovered region in the stylized scene of the completion image may be filled smoothly after being prediction by the spatial texture prediction network, while maintaining better spatial consistency.

According to the embodiment of the disclosure, the spatial texture propagation is carried out, the texture can be automatically and efficiently mapped to the three-dimensional scene mesh, and various complex occlusion and fine geometry conditions can be processed. In addition, partial texture stylization of the scene may also be implemented, thereby improving the effect and quality of texture mapping.

Referring to the fourth application scenario schematic diagram shown in FIG. 5, in the spatial texture propagation process of step 140, the texture of the stylized panoramic texture map is first projected to the visible region of the scene mesh to obtain a first stylized mesh texture map, and then spatial texture propagation is performed on the partially texture stylized scene based on the stylized UV texture. Wherein, the panoramic view angle completion is performed on the credible un-occluded area. Specifically, for different complemented viewpoints, the completion viewing angle visibility in the scene geometry is filtered based on the cameras at different completion positions, and then image completion is performed to obtain a completion image. The spatial texture prediction is performed on a tiny occluded region, in particular, in the training stage, a spatial texture prediction network $F_{I\ nit}$, a network input space coordinate x, and a real world color $C_R$ from a partial texture scene are learned, and supervision of the L2 loss function is performed by using the currently visible stylized color $C_S$; and then the trained spatial texture prediction network is used to fill remaining fine geometric or complex occlusion regions in the completion image to obtain a second stylized mesh texture mapping.

In some embodiments, as shown in FIG. 6, after step 140, the method may further include step 150.

Step 150: package a virtual window, a panoramic sky box, the second stylized mesh texture mapping and an original scene mesh to generate a target virtual scene, and displaying the target virtual scene.

Figure 7:
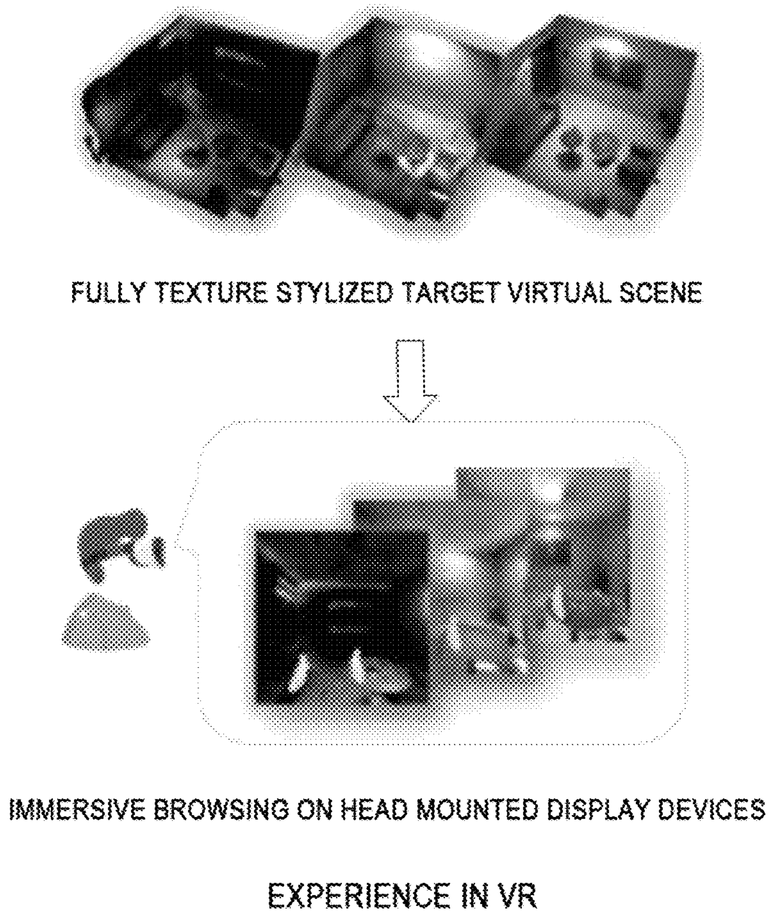
FIG. 7 is a schematic diagram of a fifth application scenario of a method of processing image according to an embodiment of the disclosure.

Referring to the fifth application scenario schematic diagram shown in FIG. 7, in step 150 of the embodiment of the disclosure, based on the virtual window of the personalized scene and the VR terminal immersive personalized application of the panoramic sky box, the target virtual scene with complete texture stylization is immersed in the head-mounted display device in an immersive manner, and the interactivity and immersion of the user and the virtual environment can be increased while the reality and visual effects are ensured, which significantly improves the VR terminal experience.

In some embodiments, step 150 may be implemented by the following step 151 to step 154.

Step 151: create a virtual environment space based on the second stylized mesh texture mapping and the original scene mesh.

Figure 8:
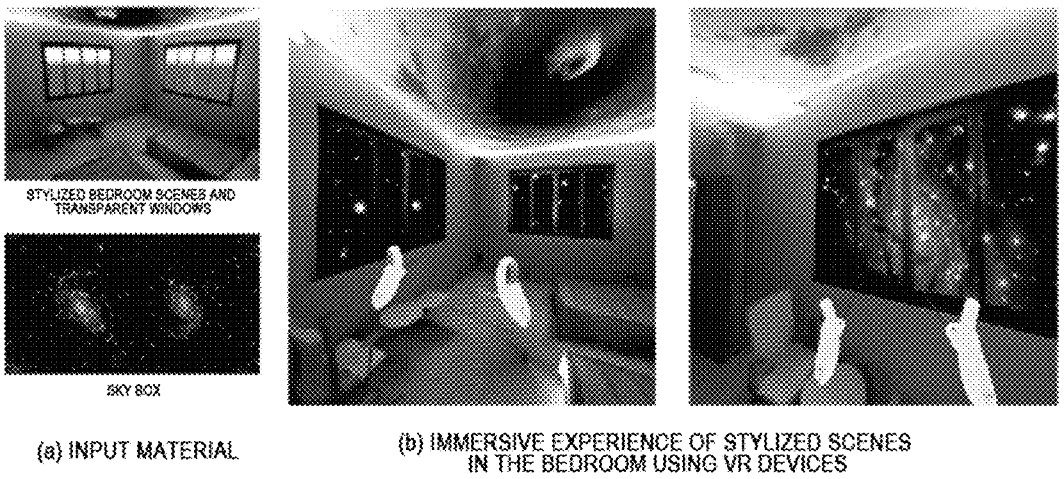
FIG. 8 is a schematic diagram of a sixth application scenario of a method of processing image according to an embodiment of the disclosure.

For example, referring to the schematic diagram of the sixth application scenario shown in FIG. 8, for example, the schematic diagram of the input material shown in FIG. 8(*a*). For example, the scene material (for example, the stylized bedroom scene and the transparent window) after stylizing in the second stylized mesh texture mapping may be imported into the game engine with the original scene mesh, and the user-defined virtual environment space is created. It can also be operated according to the actual requirements of the user to realize the personalized virtual environment space. The virtual environment space is uploaded to a head mounted display (HMD) device for a virtual tour.

The original scene mesh is a texture generated by the image acquisition device by acquiring a real scene. The original scene mesh does not contain real textures.

Step 152: generate the virtual window in the virtual environment space.

For example, in order to further enhance the immersive experience, in the game engine, a transparent alpha mask value distribution may be made to the baked UV image according to user-defined window creation requirements, and a transparent virtual window is generated at the window position indicated in the window creation request. In the process of generating the virtual window, the window size, the window shape and the window position and the visual effect thereof in the scene need to be considered. Where the alpha mask of the UV space is generated using a manner similar to the previous completion mask. This can enable a window to be opened in the virtual environment space, so that the user can see the world outside the virtual environment space, enhance the immersion of the virtual environment, and also avoid the user's motion sickness in the immersive experience.

For example, the transparent window in the schematic diagram of the input material shown in FIG. 8(*a*) may be generating the transparent window on a user-defined area after inputting the stylized bedroom scene.

Step 153: create the panoramic sky box.

For example, the panoramic sky box may be generated by the sky-box function in the game engine. The design of the panoramic sky box may be selected by the user, for example, may be consistent with the scene style or form a sharp contrast with the scene style. For example, a sky box function in a game engine may provide a plurality of sky box materials, determine a target sky box in response to a sky box material selection instruction of a user, and render the target sky box into a virtual environment space to create a panoramic sky box. This may enhance the spatial and immersion of the virtual environment.

For example, the target sky box is a sky box in the schematic diagram of the input material shown in FIG. 8(*a*), the sky box is a sky box of the starry sky theme, and target sky box is rendered into the virtual environment space to create the panoramic sky box shown in FIG. 8(*b*).

Step 154, package and render the second stylized mesh texture mapping, the original scene mesh, the virtual window, and the panoramic sky box to generate the target virtual scene, and displaying the target virtual scene.

For example, the generated second stylized mesh texture map, the original scene mesh, the virtual window, and the panoramic sky box may be packaged and rendered in the game engine to generate the target virtual scene. In the rendering process, the panoramic sky box is used as the background, and the virtual window with the transparent UV texture is turned on at the same time, so that the effect of seeing the panoramic sky box outside the virtual environment space through the transparent virtual window can be achieved. The finally displayed target virtual scene will be a fully immersive virtual environment, allowing the user to freely roam in stylized spaces with a familiar scene structure but with a completely different appearance.

As shown in FIG. 8(*b*), in the schematic diagram shown in FIG. 8(*b*), the stylized scene is immersed in a bedroom by using a VR device, and in this stylized scenario, a user can experience observing a star sky scene in a stylized bedroom scene.

According to the embodiment of the disclosure, the real scene can be converted into a stylized scene in a text driving mode, and the immersive roaming experience of 6DoF in the VR device is supported.

All the foregoing technical solutions may be combined arbitrarily to form an optional embodiment of the disclosure, and details are not described herein again.

According to the embodiment of the disclosure, the prompt word and the scene mesh are obtained, the prompt word is text information that is provided by a user and represents a scene style, and the scene mesh is a three-dimensional mesh with a real texture generated based on a real scene reconstruction; generating a stylized panoramic texture map at a center position of the scene mesh based on the prompt word; projecting a texture of the stylized panoramic texture map to a visible area of the scene mesh to obtain a first stylized mesh texture mapping; and performing a spatial texture propagation processing on the first stylized mesh texture mapping to fill a non-visible area of the scene mesh to obtain a second stylized mesh texture mapping. According to the embodiment of the disclosure, the stylized mesh texture mapping can be automatically generated based on the prompt words provided by the user, meanwhile ensure spatial consistency, mapping correctness, and completely cover complex geometries in a real scene.

Figure 9:
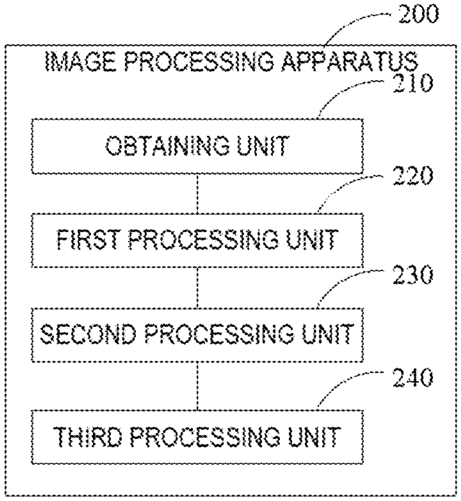
FIG. 9 is a schematic structural diagram of an apparatus for image processing according to an embodiment of the disclosure.

To better implement the method of processing image in the embodiments of the disclosure, an embodiment of the disclosure further provides an apparatus for image processing. Referring to FIG. 9, FIG. 9 is a schematic structural diagram of an apparatus for image processing according to an embodiment of the disclosure. The apparatus for image processing 200 may include:

- an obtaining unit 210, configured to obtain a prompt word and a scene mesh, wherein the prompt word is text information that is provided by a user and represents a scene style, and the scene mesh is a three-dimensional mesh with a real texture generated based on a real scene reconstruction;
- a first processing unit 220, configured to generate a stylized panoramic texture map at a center position of the scene mesh based on the prompt word;
- a second processing unit 230, configured to project a texture of the stylized panoramic texture map to a visible area of the scene mesh to obtain a first stylized mesh texture mapping; and
- a third processing unit 240, configured to perform a spatial texture propagation processing on the first stylized mesh texture mapping to fill a non-visible area of the scene mesh to obtain a second stylized mesh texture mapping.

In some embodiments, the stylized panoramic texture map includes a style priority panorama, and the first processing unit 220 may be configured to: generate the style priority panorama at the center position of the scene mesh based on the prompt word; and determine the stylized panoramic texture map based on the style priority panorama.

In some embodiments, when the generating the style priority panorama at the center position of the scene mesh based on the prompt word, the first processing unit 220 may be configured to: render a true color map and a depth map of a real scene at the center position of the scene mesh; process the prompt word, the true color map and the depth map by using a pre-trained diffusion model to generate an initial style priority panorama; and enlarge the initial style priority panorama by a predetermined magnification factor based on a super-resolution amplification technology to obtain the style priority panorama, wherein a resolution of the style priority panorama is greater than a resolution of the initial style priority panorama.

In some embodiments, the stylized panoramic texture map comprises the style priority panorama and an alignment priority panorama, and the first processing unit 220 may be further configured to: generate the alignment priority panorama based on the prompt word, the true color map and the depth map; and perform texture mixing on the style priority panorama and the alignment priority panorama to generate the stylized panoramic texture map.

In some embodiments, when generating the alignment priority panorama based on the prompt word, the true color map and the style priority panorama, the first processing unit 220 may be configured to: generate an initial alignment priority panorama by inputting the prompt word, the true color map, the depth map and the style priority panorama into the diffusion model for processing; and enlarge the initial alignment priority panorama by a predetermined magnification factor based on a super-resolution amplification technology to obtain the alignment priority panorama, wherein a resolution of the alignment priority panorama is greater than a resolution of the initial alignment priority panorama.

In some embodiments, when performing texture mixing on the style priority panorama and the alignment priority panorama to generate the stylized panoramic texture map, the first processing unit 220 may be configured to: generate a first depth edge filter mask based on an edge detection result at a jump of the depth map, wherein the first depth edge filter mask is configured to represent a pixel area in which the style priority panorama and the alignment priority panorama are mixed; and mix textures of the style priority panorama and the alignment priority panorama using a Poisson image editing algorithm based on the first depth edge filter mask to obtain the stylized panoramic texture map.

In some embodiments, the second processing unit 230 may be configured to: obtain a two-dimensional texture image of the scene mesh and a texture coordinate corresponding to each pixel in the two-dimensional texture image; compute a spatial coordinate of each pixel of the two-dimensional texture image in a three-dimensional space by an interpolation based on the two-dimensional texture image and the texture coordinate; compute a ray direction between each pixel of the two-dimensional texture image and a camera based on the spatial coordinate of each pixel of the two-dimensional texture image in the three-dimensional space, and map the ray direction onto the stylized panoramic texture map by an equidistant cylindrical projection; determine visibility information of each pixel of the two-dimensional texture image under observation of the camera to generate a first visibility mask based on the visibility information, wherein the visibility information is configured to represent whether a spatial coordinate of each pixel of the two-dimensional texture image is visible when observed from a coordinate of a center position of the camera; and assign a panoramic color of the stylized panoramic texture map to a two-dimensional texture space based on the first visibility mask and the ray direction, to project a texture of the stylized panoramic texture map to the visible area of the scene mesh, to obtain the first stylized mesh texture mapping.

In some embodiments, the third processing unit 240 may be configured to: perform panoramic viewing angle texture completion on the first stylized mesh texture mapping to obtain a completion image; and fill a non-visible area in the completion image by using a spatial texture prediction network to obtain a second stylized mesh texture mapping, wherein the non-visible area comprises at least one of the following: a fine geometric area and an occluded area.

In some embodiments, when performing panoramic viewing angle texture completion on the first stylized mesh texture mapping to obtain a completion image, the third processing unit 240 may be configured to: performing a dilation processing and a blurring processing on the first stylized mesh texture mapping to obtain a panoramic completion mask; process the prompt word, the first stylized mesh texture mapping, the depth map, and the panoramic completion mask by using an image completion model to generate an initial completion image; obtain a second depth edge filter mask, a security observation mask, and a second visibility mask, wherein the second depth edge filter mask is configured to filter an area with sudden depth change in the initial completion image, the security observation mask is configured to filter an area in the initial completion image in which an incident viewing angle from the camera to a mesh surface is less than a preset angle and/or an area in the initial completion image in which a distance between a surface point of a corresponding mesh surface and the camera is greater than a preset distance, and the second visibility mask is configured to filter a visible pixel area in the initial completion image when observed from a coordinate of a center position of a camera in a completion position; determine a trusted mask based on an intersection of the depth edge filter mask, the security observation mask and the visibility mask; and assign a panoramic texture of the initial completion image to a two-dimensional texture of the first stylized mesh texture mapping based on the trusted mask to obtain a completion image, wherein a two-dimensional texture of the first stylized mesh texture mapping is obtained by multiplexing the first visibility mask.

In some embodiments, when filling a non-visible area in the completion image by using a spatial texture prediction network to obtain a second stylized mesh texture mapping, the third processing unit 240 may be configured to: provide spatial coordinates and real world colors of all pixels in the two-dimensional texture image of the scene mesh to the spatial texture prediction network to predict a target color; obtain a third visibility mask by combining the first visibility mask and the second visibility mask; and fuse the predicted target color to the non-visible area in the completion image through the third visibility mask to obtain the second stylized mesh texture mapping.

In some embodiments, the apparatus for image processing 200 further includes:

a fourth processing unit, configured to package a virtual window, a panoramic sky box, the second stylized mesh texture mapping and an original scene mesh to generate a target virtual scene, and displaying the target virtual scene.

In some embodiments, the fourth processing unit is configured to: create a virtual environment space based on the second stylized mesh texture mapping and the original scene mesh; generate the virtual window in the virtual environment space; create the panoramic sky box; and package and render the second stylized mesh texture mapping, the original scene mesh, the virtual window, and the panoramic sky box to generate the target virtual scene, and display the target virtual scene.

Each unit in the foregoing apparatus for image processing 200 may be implemented in whole or in part by software, hardware, or a combination thereof. The foregoing units may be embedded in or independent of a processor in the terminal device in a hardware form, or may be stored in a memory in the terminal device in a software form, so that the processor invokes and performs an operation corresponding to foregoing each unit.

The apparatus for image processing 200 may be integrated in a terminal or a server provided with a storage and having an operation capability, or the apparatus for image processing 200 is the terminal or a server.

In some embodiments, the disclosure further provides a terminal device, including a memory and a processor, where the memory stores a computer program, and when the processor executes the computer program, the steps in the foregoing method embodiments are implemented.

Figure 10:
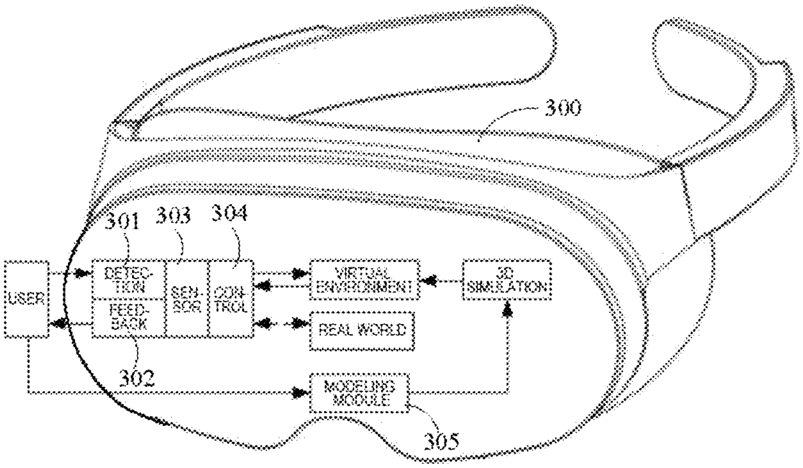
FIG. 10 is a schematic diagram of a first structure of a terminal device according to an embodiment of the disclosure.

As shown in FIG. 10, FIG. 10 is a schematic structural diagram of a terminal device according to an embodiment of the disclosure. The terminal 300 may be generally provided in the form of glasses, Head Mounted Displays (HMDs), or contact lenses for realizing visual perception and other forms of perception, but the form of terminal device implementation is not limited thereto, and may be further miniaturized or enlarged as necessary. The terminal device 300 may include, but is not limited to, the following components:

- a detection module 301, configured to detect the operation command of the user by using various sensors, and apply to the virtual environment, for example, the image displayed on the display screen is continuously updated according to the sight line of the user, and interaction between the user and the virtual and scene is realized, for example, the real content is continuously updated based on the detected rotation direction of the head of the user;
- a feedback module 302, configured to receive data from the sensor and provide real-time feedback to the user, wherein the feedback module 302 may be configured to display a graphical user interface, for example, display a virtual environment on the graphical user interface. For example, the feedback module 302 may include a display screen or the like;
- a sensor 303, configured to receive the operation command from the user on the one hand and apply them to the virtual environment; and provide the result generated after the operation to the user in various feedback forms on the other hand;
- a control module 304, configured to control the sensors and various input/output devices, including obtaining data (such as actions, speech) and output perception data of the user, such as images, vibration, temperature, sound, etc., and play roles in the user, the virtual environment and the real world; and
- a modeling module 305, configured to construct a 3D Model of the virtual environment, and may further include various feedback mechanisms such as sound and sensation in the three-dimensional model.

In the embodiment of the disclosure, the virtual scene in the three-dimensional scene mesh may be constructed by using the modeling module 305; obtaining the prompt word and the scene mesh by using the detection module 301, the prompt word is text information that is provided by the user and represents the style of the scene, and the scene mesh is a three-dimensional mesh with a real texture generated based on the real scene reconstruction; generating a stylized panoramic texture map at a center position of the scene mesh based on the prompt word by using the control module 304; projecting a texture of the stylized panoramic texture map to a visible area of the scene mesh to obtain a first stylized mesh texture mapping; performing a spatial texture propagation processing on the first stylized mesh texture mapping to fill a non-visible area of the scene mesh to obtain a second stylized mesh texture mapping; and the virtual window and the panoramic sky box may be rendered to the second stylized mesh texture map to generate the target virtual scene. The graphical user interface may be displayed through the feedback module 302, and the graphical user interface may include a second stylized mesh texture mapping, or may include a target virtual scene.

Figure 11:
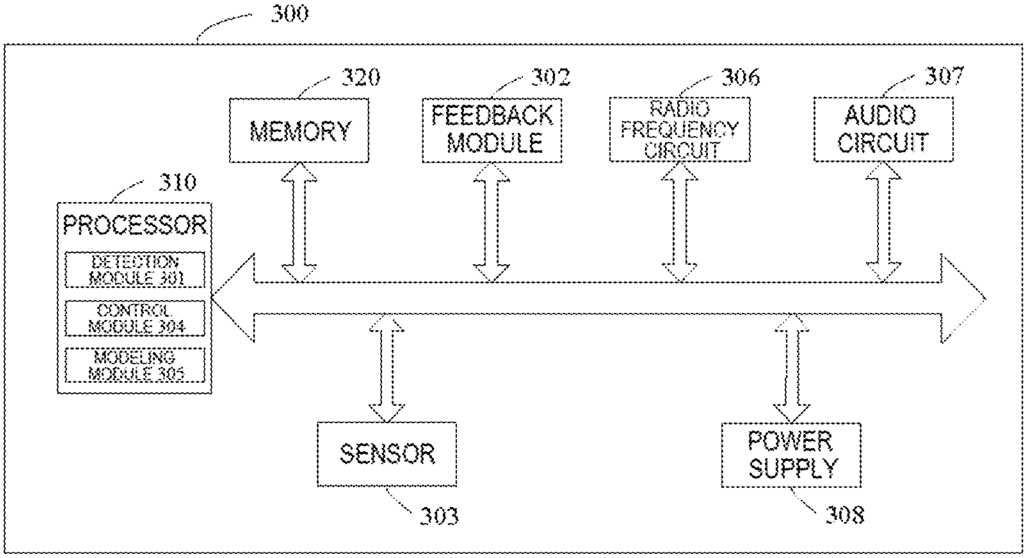
FIG. 11 is a second schematic structural diagram of a terminal device according to an embodiment of the disclosure.

In some embodiments, as shown in FIG. 11, FIG. 11 is another schematic structural diagram of a terminal device according to an embodiment of the disclosure, and the terminal device 300 further includes a processor 310 having one or more processing cores, a memory 320 having one or more computer-readable storage media, and a computer program stored on the memory 320 and executable on the processor. The processor 310 is electrically connected to the memory 320. A person skilled in the art may understand that the terminal device structure shown in the figure does not constitute a limitation on the terminal device, and may include more or fewer components than those shown in the figure, or combine some components, or arrange different components.

The processor 310 is a control center of the terminal device 300, connects various parts of the entire terminal device 300 by using various interfaces and lines, performs various functions and processing data of the terminal device 300 by running or loading software programs and/or modules stored in the memory 320, and invoking data stored in the memory 320, thereby performing overall monitoring on the terminal device 300.

In the embodiment of the disclosure, the processor 310 in the terminal device 300 loads an instruction corresponding to a process of one or more application programs into the memory 320 according to the following steps, and runs an application program stored in the memory 320 by the processor 310, to implement various functions.

Obtaining a prompt word and a scene mesh, wherein the prompt word is text information that is provided by a user and represents a scene style, and the scene mesh is a three-dimensional mesh with a real texture generated based on a real scene reconstruction; generating a stylized panoramic texture map at a center position of the scene mesh based on the prompt word; projecting a texture of the stylized panoramic texture map to a visible area of the scene mesh to obtain a first stylized mesh texture mapping; and performing a spatial texture propagation processing on the first stylized mesh texture mapping to fill a non-visible area of the scene mesh to obtain a second stylized mesh texture mapping.

For implementation of the foregoing operations, reference may be made to the foregoing embodiments, and details are not described herein again.

In some embodiments, the processor 310 may include a detection module 301, a control module 304, and a modeling module 305.

In some embodiments, as shown in FIG. 11, the terminal device 300 further includes a radio frequency circuit 306, an audio circuit 307, and a power supply 308. The processor 310 is electrically connected to the memory 320, the feedback module 302, the sensor 303, the radio frequency circuit 306, the audio circuit 307, and the power supply 308, respectively. A person skilled in the art may understand that the terminal device structure shown in FIG. 10 or FIG. 11 does not constitute a limitation on the terminal device, and may include more or fewer components than those shown in the figure, or combine some components, or arrange different components.

The radio frequency circuit 306 may be configured to transmit and receive a radio frequency signal, to establish wireless communication with a network device or another terminal device through wireless communication, and receive and send a signal with a network device or another terminal device.

The audio circuit 307 may be configured to provide an audio interface between a user and a terminal device through a speaker and a microphone. The audio circuit 307 may convert the received audio data into an electrical signal, transmit the electrical signal to the speaker, and convert the electrical signal into a sound signal output by the speaker; on the other hand, the microphone converts the collected sound signal into an electrical signal, and converts the electrical signal into audio data after being received by the audio circuit 307, and then outputs the audio data to the processor 301 for processing, and then transmits the audio data to, for example, another terminal device, or outputs the audio data to the memory for further processing through the radio frequency circuit 306. The audio circuit 307 may further include an earplug jack to provide communication between the peripheral earphone and the terminal device.

The power supply 308 is configured to supply power to various components of the terminal device 300.

Although not shown in FIG. 10 or FIG. 11, the terminal device 300 may further include a camera, a wireless fidelity module, a Bluetooth module, an input module, and the like, and details are not described herein again.

In some embodiments, the disclosure further provides a computer-readable storage medium, configured to store a computer program. The computer-readable storage medium may be applied to a terminal device or a server, and the computer program causes the terminal device or the server to perform a corresponding procedure in the method of processing image in the embodiments of the disclosure. For the sake of simplicity, the details are not described herein again.

In some embodiments, the disclosure further provides a computer program product, wherein the computer program product includes a computer program, and the computer program is stored in a computer-readable storage medium. The processor of the terminal device reads the computer program from the computer-readable storage medium, and the processor executes the computer program, so that the terminal device performs corresponding procedures in the method of processing image in the embodiments of the disclosure. For the sake of simplicity, the details are not described herein again.

The disclosure further provides a computer program, wherein the computer program includes a computer program, and the computer program is stored in a computer-readable storage medium. The processor of the terminal device reads the computer program from the computer-readable storage medium, and the processor executes the computer program, so that the terminal device performs corresponding procedures in the method of processing image in the embodiments of the disclosure. For the sake of simplicity, the details are not described herein again.

It should be understood that the processor in the embodiment of the disclosure may be an integrated circuit chip, and has a signal processing capability. In an implementation process, steps in the foregoing method embodiments may be completed by using an integrated logic circuit of hardware in the processor or an instruction in a form of software. The processor may be a general purpose processor, a digital signal processor (DSP), an application specific integrated circuit (ASIC), a field programmable gate array (FPGA) or another programmable logic device, a discrete gate or transistor logic device, or a discrete hardware component. The methods, steps, and logical block diagrams disclosed in the embodiments of the disclosure may be implemented or performed. The general purpose processor may be a microprocessor or the processor, may be any conventional processor or the like. The steps of the method disclosed in connection with the embodiments of the disclosure may be directly implemented as a hardware decoding processor or a combination of hardware and software modules in a decoding processor. The software module may be located a mature storage medium in the art such as a random access memory, a flash memory, a read-only memory, a programmable read-only memory, an electrically erasable programmable memory, a register, or the like. The storage medium is located in the memory, the processor reads information in the memory, and completes the steps of the foregoing method in combination with hardware of the storage medium.

One of ordinary skill in the art may appreciate that the units and algorithm steps of the examples described in connection with the embodiments disclosed herein can be implemented in electronic hardware, or in combination of computer software and electronic hardware. Whether these functions are performed in hardware or software depends on the specific application and design constraints of the technical solutions. Those skilled in the art may use different methods for each particular application to implement the described functionality, but such implementations should not be considered to be beyond the scope of the disclosure.

It should be clearly understood by those skilled in the art that, for the convenience and brevity of description, the specific working processes of the systems, devices and units described above may refer to the corresponding processes in the foregoing method embodiments, and details are not described herein again.

In the several embodiments provided in the disclosure, it should be understood that the disclosed systems, apparatuses, and methods may be implemented in other manners. For example, the apparatus embodiments described above are merely illustrative, for example, the division of the units is merely a logical function division, and in actual implementation, there may be another division manner, for example, multiple units or components may be combined or may be integrated into another system, or some features may be ignored, or not executed. Alternatively, the mutual coupling or direct coupling or communication connection shown or discussed may be an indirect coupling or communication connection through some interfaces, devices, or units, and may be in electrical, mechanical, or other forms.

The units described as separate components may or may not be physically separate, and components displayed as units may or may not be physical units, that is, may be located in one place, or may be distributed to multiple network units. Some or all of the units may be selected according to actual needs to achieve the purpose of the solution of this embodiment.

In addition, each functional unit in this embodiment of the disclosure may be integrated into one processing unit, or may be separately physically present by each unit, or may be integrated in one unit by two or more units.

The functions may be stored in a computer-readable storage medium if implemented in the form of software functional units and sold or used as independent products.

Based on such an understanding, the technical solution of the disclosure essentially or a part contributing to the prior art or a part of the technical solution may be embodied in the form of a software product, and the computer software product is stored in a storage medium and includes several instructions for enabling a terminal device (which may be a personal computer, a server) to perform all or part of the steps of the method in the embodiments of the disclosure. The foregoing storage medium includes a USB flash disk, a mobile hard disk, a ROM, a RAM, a magnetic disk, or an optical disk, and various media that can store program code.

The foregoing descriptions are only specific implementations of the disclosure, but the protection scope of the disclosure is not limited thereto, and any person skilled in the art may easily conceive of changes or replacements within the technical scope of the disclosure, and should be covered within the protection scope of the disclosure. Therefore, the protection scope of the disclosure should be defined by the protection scope of the claims.

We claim:

1. A method of processing image, comprising:

obtaining a prompt word and a scene mesh, wherein the prompt word is text information that is provided by a user and represents a scene style, and the scene mesh is a three-dimensional mesh with a real texture generated based on a real scene reconstruction;

generating a stylized panoramic texture map at a center position of the scene mesh based on the prompt word;

projecting a texture of the stylized panoramic texture map to a visible area of the scene mesh to obtain a first stylized mesh texture mapping; and performing a spatial texture propagation processing on the first stylized mesh texture mapping to fill a non-visible area of the scene mesh to obtain a second stylized mesh texture mapping, wherein the stylized panoramic texture map comprises a style priority panorama, and the generating a stylized panoramic texture map at a center position of the scene mesh based on the prompt word comprises:

generating the style priority panorama at the center position of the scene mesh based on the prompt word; and determining the stylized panoramic texture map based on the style priority panorama.

2. The method of claim 1, wherein the generating the style priority panorama at the center position of the scene mesh based on the prompt word comprises:

rendering a true color map and a depth map of a real scene at the center position of the scene mesh;

processing the prompt word, the true color map and the depth map by using a pre-trained diffusion model to generate an initial style priority panorama; and enlarging the initial style priority panorama by a predetermined magnification factor based on a super-resolution amplification technology to obtain the style priority panorama, wherein a resolution of the style priority panorama is greater than a resolution of the initial style priority panorama.

3. The method of claim 2, wherein the stylized panoramic texture map comprises the style priority panorama and an alignment priority panorama, and the determining the stylized panoramic texture map based on the style priority panorama comprises:

generating the alignment priority panorama based on the prompt word, the true color map and the depth map; and performing texture mixing on the style priority panorama and the alignment priority panorama to generate the stylized panoramic texture map.

4. The method of claim 3, wherein the generating the alignment priority panorama based on the prompt word, the true color map and the depth map comprises:

generating an initial alignment priority panorama by inputting the prompt word, the true color map, the depth map and the style priority panorama into the diffusion model for processing; and enlarging the initial alignment priority panorama by a predetermined magnification factor based on a super-resolution amplification technology to obtain the alignment priority panorama, wherein a resolution of the alignment priority panorama is greater than a resolution of the initial alignment priority panorama.

5. The method of claim 3, wherein the performing texture mixing on the style priority panorama and the alignment priority panorama to generate the stylized panoramic texture map comprises:

generating a first depth edge filter mask based on an edge detection result at a jump of the depth map, wherein the first depth edge filter mask is configured to represent a pixel area in which the style priority panorama and the alignment priority panorama are mixed; and mixing textures of the style priority panorama and the alignment priority panorama using a Poisson image editing algorithm based on the first depth edge filter mask to obtain the stylized panoramic texture map.

6. The method of claim 2, wherein the projecting a texture of the stylized panoramic texture map to a visible area of the scene mesh to obtain a first stylized mesh texture mapping comprises:

obtaining a two-dimensional texture image of the scene mesh and a texture coordinate corresponding to each pixel in the two-dimensional texture image;

computing a spatial coordinate of each pixel of the two-dimensional texture image in a three-dimensional space by an interpolation based on the two-dimensional texture image and the texture coordinate;

computing a ray direction between each pixel of the two-dimensional texture image and a camera based on the spatial coordinate of each pixel of the two-dimensional texture image in the three-dimensional space, and mapping the ray direction onto the stylized panoramic texture map by an equidistant cylindrical projection;

determining visibility information of each pixel of the two-dimensional texture image under observation of the camera to generate a first visibility mask based on the visibility information, wherein the visibility information is configured to represent whether a spatial coordinate of each pixel of the two-dimensional texture image is visible when observed from a coordinate of a center position of the camera; and assigning a panoramic color of the stylized panoramic texture map to a two-dimensional texture space based on the first visibility mask and the ray direction, to project a texture of the stylized panoramic texture map to the visible area of the scene mesh, to obtain the first stylized mesh texture mapping.

7. The method of claim 6, wherein the performing spatial texture propagation processing on the first stylized mesh texture mapping to fill a non-visible area of the scene mesh to obtain a second stylized mesh texture mapping comprises:

performing panoramic viewing angle texture completion on the first stylized mesh texture mapping to obtain a completion image; and filling a non-visible area in the completion image by using a spatial texture prediction network to obtain a second stylized mesh texture mapping, wherein the non-visible area comprises at least one of the following: a fine geometric area and an occluded area.

8. The method of claim 7, wherein the performing panoramic viewing angle texture completion on the first stylized mesh texture mapping to obtain a completion image comprises:

performing a dilation processing and a blurring processing on the first stylized mesh texture mapping to obtain a panoramic completion mask;

processing the prompt word, the first stylized mesh texture mapping, the depth map, and the panoramic completion mask by using an image completion model to generate an initial completion image;

obtaining a second depth edge filter mask, a security observation mask, and a second visibility mask, wherein the second depth edge filter mask is configured to filter an area with sudden depth change in the initial completion image, the security observation mask is configured to filter an area in the initial completion image in which an incident viewing angle from the camera to a mesh surface is less than a preset angle and/or an area in the initial completion image in which a distance between a surface point of a corresponding mesh surface and the camera is greater than a preset distance, and the second visibility mask is configured to filter a visible pixel area in the initial completion image when observed from a coordinate of a center position of a camera in a completion position;

determining a trusted mask based on an intersection of the depth edge filter mask, the security observation mask and the visibility mask; and assigning a panoramic texture of the initial completion image to a two-dimensional texture of the first stylized mesh texture mapping based on the trusted mask to obtain a completion image, wherein a two-dimensional texture of the first stylized mesh texture mapping is obtained by multiplexing the first visibility mask.

9. The method of claim 8, wherein the filling a non-visible area in the completion image by using a spatial texture prediction network to obtain a second stylized mesh texture mapping comprises:

providing spatial coordinates and real world colors of all pixels in the two-dimensional texture image of the scene mesh to the spatial texture prediction network to predict a target color;

obtaining a third visibility mask by combining the first visibility mask and the second visibility mask; and fusing the predicted target color to the non-visible area in the completion image through the third visibility mask to obtain the second stylized mesh texture mapping.

10. The method of claim 1, further comprising:

packaging a virtual window, a panoramic sky box, the second stylized mesh texture mapping and an original scene mesh to generate a target virtual scene, and displaying the target virtual scene.

11. The method of claim 10, wherein the packaging a virtual window, a panoramic sky box, the second stylized mesh texture mapping and an original scene mesh to generate a target virtual scene, and displaying the target virtual scene comprises:

creating a virtual environment space based on the second stylized mesh texture mapping and the original scene mesh;

generating the virtual window in the virtual environment space;

creating the panoramic sky box; and packaging and rendering the second stylized mesh texture mapping, the original scene mesh, the virtual window, and the panoramic sky box to generate the target virtual scene, and displaying the target virtual scene.

12. A non-transitory computer-readable storage medium, storing a computer program, which is adapted to be loaded by a processor to perform acts comprising:

obtaining a prompt word and a scene mesh, wherein the prompt word is text information that is provided by a user and represents a scene style, and the scene mesh is a three-dimensional mesh with a real texture generated based on a real scene reconstruction;

generating a stylized panoramic texture map at a center position of the scene mesh based on the prompt word;

projecting a texture of the stylized panoramic texture map to a visible area of the scene mesh to obtain a first stylized mesh texture mapping; and performing a spatial texture propagation processing on the first stylized mesh texture mapping to fill a non-visible area of the scene mesh to obtain a second stylized mesh texture mapping, wherein the stylized panoramic texture map comprises a style priority panorama, and the generating a stylized panoramic texture map at a center position of the scene mesh based on the prompt word comprises:

generating the style priority panorama at the center position of the scene mesh based on the prompt word; and determining the stylized panoramic texture map based on the style priority panorama.

13. A terminal device, comprising a processor and a memory, wherein the memory stores a computer program, and the processor is configured to invoke the computer program stored in the memory to perform acts comprising:

obtaining a prompt word and a scene mesh, wherein the prompt word is text information that is provided by a user and represents a scene style, and the scene mesh is a three-dimensional mesh with a real texture generated based on a real scene reconstruction;

generating a stylized panoramic texture map at a center position of the scene mesh based on the prompt word;

projecting a texture of the stylized panoramic texture map to a visible area of the scene mesh to obtain a first stylized mesh texture mapping; and performing a spatial texture propagation processing on the first stylized mesh texture mapping to fill a non-visible area of the scene mesh to obtain a second stylized mesh texture mapping, wherein the stylized panoramic texture map comprises a style priority panorama, and the generating a stylized panoramic texture map at a center position of the scene mesh based on the prompt word comprises:

generating the style priority panorama at the center position of the scene mesh based on the prompt word; and determining the stylized panoramic texture map based on the style priority panorama.

14. The terminal device of claim 13, wherein the generating the style priority panorama at the center position of the scene mesh based on the prompt word comprises:

rendering a true color map and a depth map of a real scene at the center position of the scene mesh;

processing the prompt word, the true color map and the depth map by using a pre-trained diffusion model to generate an initial style priority panorama; and enlarging the initial style priority panorama by a predetermined magnification factor based on a super-resolution amplification technology to obtain the style priority panorama, wherein a resolution of the style priority panorama is greater than a resolution of the initial style priority panorama.

15. The terminal device of claim 14, wherein the stylized panoramic texture map comprises the style priority panorama and an alignment priority panorama, and the determining the stylized panoramic texture map based on the style priority panorama comprises:

generating the alignment priority panorama based on the prompt word, the true color map and the depth map; and performing texture mixing on the style priority panorama and the alignment priority panorama to generate the stylized panoramic texture map.

16. The terminal device of claim 15, wherein the generating the alignment priority panorama based on the prompt word, the true color map and the depth map comprises:

generating an initial alignment priority panorama by inputting the prompt word, the true color map, the depth map and the style priority panorama into the diffusion model for processing; and enlarging the initial alignment priority panorama by a predetermined magnification factor based on a super-resolution amplification technology to obtain the alignment priority panorama, wherein a resolution of the alignment priority panorama is greater than a resolution of the initial alignment priority panorama.

17. The terminal device of claim 15, wherein the performing texture mixing on the style priority panorama and the alignment priority panorama to generate the stylized panoramic texture map comprises:

generating a first depth edge filter mask based on an edge detection result at a jump of the depth map, wherein the first depth edge filter mask is configured to represent a pixel area in which the style priority panorama and the alignment priority panorama are mixed; and mixing textures of the style priority panorama and the alignment priority panorama using a Poisson image editing algorithm based on the first depth edge filter mask to obtain the stylized panoramic texture map.

18. The terminal device of claim 14, wherein the projecting a texture of the stylized panoramic texture map to a visible area of the scene mesh to obtain a first stylized mesh texture mapping comprises:

obtaining a two-dimensional texture image of the scene mesh and a texture coordinate corresponding to each pixel in the two-dimensional texture image;

computing a spatial coordinate of each pixel of the two-dimensional texture image in a three-dimensional space by an interpolation based on the two-dimensional texture image and the texture coordinate;

computing a ray direction between each pixel of the two-dimensional texture image and a camera based on the spatial coordinate of each pixel of the two-dimensional texture image in the three-dimensional space, and mapping the ray direction onto the stylized panoramic texture map by an equidistant cylindrical projection;

determining visibility information of each pixel of the two-dimensional texture image under observation of the camera to generate a first visibility mask based on the visibility information, wherein the visibility information is configured to represent whether a spatial coordinate of each pixel of the two-dimensional texture image is visible when observed from a coordinate of a center position of the camera; and assigning a panoramic color of the stylized panoramic texture map to a two-dimensional texture space based on the first visibility mask and the ray direction, to project a texture of the stylized panoramic texture map to the visible area of the scene mesh, to obtain the first stylized mesh texture mapping.

* * * * *